United States Patent [19]
Dutta

[11] Patent Number: 5,660,918
[45] Date of Patent: Aug. 26, 1997

[54] WASH DURABLE FABRIC LAMINATES

[75] Inventor: Anit Dutta, Wilmington, Del.

[73] Assignee: W. L. Gore & Associates, Inc., Newark, Del.

[21] Appl. No.: 633,714

[22] Filed: Apr. 17, 1996

[51] Int. Cl.$^6$ ............................................. B32B 3/00
[52] U.S. Cl. ................................... 428/196; 428/197
[58] Field of Search ............................. 428/197, 198, 428/253, 284, 247, 255, 196

[56] References Cited

U.S. PATENT DOCUMENTS

| | | | |
|---|---|---|---|
| 4,532,316 | 7/1985 | Henn | 528/59 |
| 4,761,324 | 8/1988 | Rautenberg et al. | 428/198 |
| 4,862,730 | 9/1989 | Crosby | 73/38 |
| 4,935,287 | 6/1990 | Johnson et al. | 428/198 |

OTHER PUBLICATIONS

Modern Coating and Drying Technology, E.D. Cohen and E.B. Gutoff (editors), p. 103, VCH Publishers, Inc., New York, 1992.

Handbook of Pressure Sensitive Adhesive Technology, D. Satas (editor, p. 789, Van Nostrand Reinhold, New York, 1989.

*Primary Examiner*—James J. Bell

[57] ABSTRACT

A delamination problem in fabric laminates made of a fabric laminated to a nonporous, hydrophilic organic polymer film, such as a breathable polyurethane film, was found to be caused by the hydrophilic nature of the polymer. A particular adhesive pattern was devised to overcome the delamination problem. More specifically, a wash-durable fabric laminate of a continuous, non-porous hydrophilic polymer, e.g., a breathable polyurethane, layer and a fabric layer were bonded together by a discontinuous, but interconnected pattern of an adhesive layer. The fabric laminate is water-vapor-permeable, air-impermeable and liquid water impermeable.

6 Claims, 1 Drawing Sheet

WASH DURABLE FABRIC LAMINATES

FIELD OF THE INVENTION

This invention relates to laminates of a fabric material adhered by adhesive to a layer of a non-porous hydrophilic organic polymer.

BACKGROUND OF THE INVENTION

Hydrophilic non-porous organic polymers, such as polyurethanes, transport water vapor molecules through them by a molecular transport mechanism. Thus, these polymers "breathe", i.e., allow water vapor, as in perspiration, to pass through them even though they are not porous, i.e., do not contain voids running from one side to the other. Because they are non-porous, they are liquid water impervious and air-impermeable (windproof and contamination resistant).

These qualities make them useful as continuous coatings on fabrics, such as cotton, wool, nylon, polyester or the like, that are used in garment constructions. Alternatively, continuous films of such "breathable" polymers are adhesively bonded to these fabrics to create fabric laminates useful in making clothing articles. These fabric laminates "breathe" thereby keeping the wearer comfortable while providing protection from the environment by keeping out rain, wind, snow, viruses, particulates, etc.

It is well known in the art that breathable fabric laminates are created by bonding a continuous film of a hydrophilic polymer to a fabric substrate by using a hydrophobic adhesive deposited in a discontinuous, non-interconnected pattern. U.S. Pat. No. 4,935,287 to Johnson and U.S. Pat. No. 4,761,324 to Rautenberg, for example, describe such lamination methods.

It is a common practice to use engraved gravure rolls to deposit such discontinuous, non-interconnected adhesive patterns on a substrate. Details of such patterns can be found in standard books like "Modern Coating and Drying Technology", p. 103, E. D. Cohen and E. B. Gutoff (editors), VCH Publishers, Inc., New York, 1992 and "Handbook of Pressure Sensitive Adhesive Technology", p. 789, D. Satas (editor), Van Nostrand Reinhold, New York, 1989, as well as in U.S. Pat. No. 4,761,324 by Rautenberg. However, no reference was found directed to the use of engraved gravure rolls to deposit discontinuous, but interconnected adhesive pattern to laminate a hydrophilic polymer film to a fabric layer to create a breathable fabric laminate.

A problem with these breathable fabric laminates is their poor durability during washing. Owing to the hydrophilic nature of the breathable polymer film, it is difficult to get the film to remain bonded to the fabric during continuous washing. This is a serious deficiency in these laminates as these are used to construct garments that are subjected to laundering.

SUMMARY OF THE INVENTION

This low wash durability has now been found to be due to the hydrophilic nature of the non-porous hydrophilic polymer layer. During washing the wash water is absorbed to some extent by the polymer causing it to swell, deform and thereby create stresses which adversely affect laminate adhesion. It is a first aspect of this invention that this delamination problem was found to be caused by the hydrophilic nature of the polymer, which property is the very property making the polymer useful with fabrics.

It was also observed that the thicker the hydrophilic polymer layer, the more severe the delamination problem during washing cycles. This is apparently due to the thicker bulk of the polymer, which absorbs increasing amounts of wash water and magnifies the effect of internal stresses during washing.

It is a second aspect of this invention that once the cause of the problem was found, a particular adhesive pattern was devised to overcome the delamination problem.

Accordingly, this invention includes a wash-durable fabric laminate comprising:

(a) a continuous, non-porous layer of a hydrophilic polymer, e.g., a breathable polyurethane, layer;

(b) a fabric layer;

wherein the polymer layer is bonded to the fabric layer by a discontinuous, but interconnected pattern of an adhesive layer in between;

said fabric laminate being water-vapor-permeable, air-impermeable and liquid water impermeable.

DETAILED DESCRIPTION OF THE INVENTION

By the term "continuous" is meant that the hydrophilic polymer continuously covers the fabric surface.

By the term "non-porous" is meant that there are no voids in the hydrophilic polymer extending from one side of the layer to the other.

By the term "hydrophilic" is meant that the polymer has the ability to transport individual water molecules through it by molecular diffusion. Polymers exhibiting this phenomena are referred to sometimes as "breathable" polymers. In polyurethanes, such polymers have repeating ethylene oxide units in them ($-CH_2-CH_2-O-$).

Figure 1:
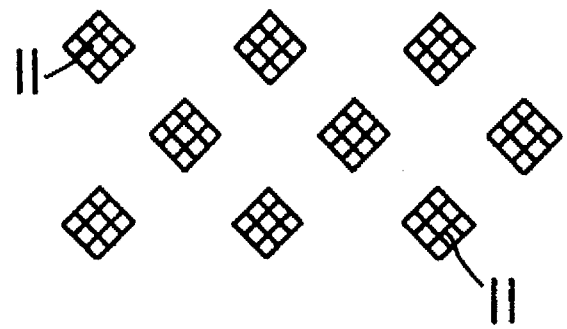
FIG. 1 depicts a "dot" adhesive pattern used in the prior art.
Figure 2:
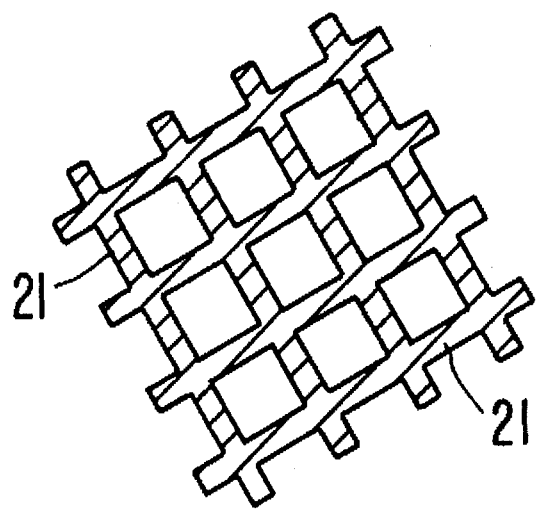
FIG. 2 depicts the discontinuous, but interconnected pattern used in this invention.

The discontinuous, but interconnected adhesive pattern 20, is depicted by the grid configuration of adhesive 21 shown in FIG. 2. It is discontinuous because it does not completely cover a surface. But, as seen, the configuration is interconnected. In contrast the prior art configuration 10 of FIG. 1 shows the adhesive 11 in a "dot" configuration where the adhesive pattern is discontinuous but not interconnected. It is understood that the "dots" can be elongated to the point where they "join" and in that event the grid pattern of FIG. 2 will be obtained. Therefore, this invention includes such intermediate configurations of adhesive. At what point these intermediate configurations become a part of this invention can easily be determined by the wash-cycle durability test described following.

Wash durability is determined by continuously washing a piece of laminated fabric/hydrophilic polymer in an automatic washing machine (AATCC approved Kenmore washer) using ambient tap water and visually noting the time it takes for the laminate to develop a delaminated area that is 0.5 inches or more in width.

Determination of the Cause of the Problem

To determine why lamination failure was occurring in laminates in which the layers were adhesively bonded by an adhesive applied in a "dot" configuration using engraved gravure rolls that deposited a discrete dot pattern as shown in FIG. 1. Two gravure patterns were used, but both delivered the FIG. 1 adhesive dot pattern. The difference was that one gravure pattern has 35 pyramidal cells per inch at a cell depth of 130 micrometers, while the other pattern had 35 pyramidal cells per inch with a cell depth of 160 micrometers. Owing to its increased depth, the 160 μm pattern deposited about 7-9 gm/yd$^2$ adhesive while the 130 μm pattern deposited 3-4 gm/yd$^2$. The breathable polymer films used were of different thicknesses obtained by extrusion casting of a thermoplastic polyurethane polymer made from diphenylmethane diisocyanate, polyoxyethylene glycol 1450 and 1,4-butanediol in a mole ratio of 4:1:3. These films constituted the continuous, non-porous, hydrophilic polymer layer.

Specifically, the adhesive used was a prepolymer of diphenylmethane dissocyanate, polytetramethylene ether glycol 1000, and pentanediol. Adhesives of this type are described more fully in U.S. Pat. No. 4,532,316 to Henn, incorporated herein by reference. These adhesives do not transmit any appreciable amount of moisture vapor through them and are considered hydrophobic.

The laminates were prepared by preheating the adhesive to 105° C. and applying it to the hydrophilic polyurethane film in a "dot" pattern using a gravure roll heated at 105° C. A textile fabric, specifically a woven nylon (2.8 oz./yd.$^2$ supplex Taslite®) fabric, was then applied by feeding it along a moving belt of the adhesive printed film and pressing the fabric between two rolls maintained at 40° C. The same method was used to create laminates using other fabrics like 1.5 oz./yd.$^2$ nylon Tricot knitted fabric and 5.3 oz./yd.$^2$ (83% nylon/17% Lycra®) knitted fabric.

Fabric laminates prepared as described immediately above were tested for wash durability as described above. Results were as follows:

| Gravure** Cell Depth (μm) | Breathable Polyurethane Film Thickness | Fabric Type | Avg. MVTR | Wash Hours before Delamination |
|---|---|---|---|---|
| 130 | 2 mil | Woven Taslite | — | 1.5 |
| 160 | 2 mil | Woven Taslite | — | 24 |
| 160 | 0.5 mil | Woven Taslite | — | 1300 |
| 160 | 2 mil | Woven Taslite | 5202 | 101–300 |
| 160 | 0.5 mil | Woven Taslite | 9860 | >2171 |
| 160 | 2 mil | Tricot Knit | 4837 | 48 |
| 160 | 1 mil | Tricot Knit | 5925 | 302* |
| 160 | 0.5 mil | Tricot Knit | 9813 | 701 |
| 160 | 2 mil | Lycra ® Knit | 4351 | 96 |
| 160 | 1 mil | Lycra ® Knit | 5682 | 326 |
| 160 | 0.5 mil | Lycra ® Knit | 8291 | 801 |

*Stopped due to disintegration of the Tricot Knit.
**Gravure pattern consists of 35 pyramidal cells per linear inch.

These data confirmed that everything else being equal, wash durability of the laminate depends on the film thickness of the breathable polymer with the durability decreasing as the thickness increases. This is believed to be a result of the hydrophilic nature of the film. Unlike conventional polyurethane films that are not hydrophilic, these films swell in contact with water which in turn creates stresses on the discrete adhesive dots leading to delamination during continuous washing. As thickness increases, the magnitude of these stresses also increases which in turn leads to earlier delamination or reduced wash durability. The data also confirmed that the 160 μm deep pattern gives better wash durability than the 130 μm deep pattern due to higher amounts of adhesive printed onto the film.

MVTR is Moisture Vapor Transmission Rate and records the degree to which the initial sample (i.e. before washing) transmits water vapor.

MVTR was Determined as Follows

A potassium acetate solution, having a paste like consistency, was prepared from potassium acetate and distilled water. (Such a paste may be obtained by combining 230 g potassium acetate with 100 g of water, for example). This solution was placed into a 133 ml. polypropylene cup, having inside diameter of 6.5 cm. at its mouth. An expanded polytetrafluoroethylene (ePTFE) membrane was provided having a minimum MVTR of approximately 85,000 g/m$^2$-24 hr. as tested by the method described in U.S. Pat. No. 4,862,730 to Crosby. The ePTFE was heat sealed to the lip of the cup to create a taut, leakproof, microporous barrier containing the solution.

A similar ePTFE membrane was mounted to the surface of a water bath. The water bath assembly was controlled at 23° C.±0.2° C. utilizing a temperature controlled room and a water circulating bath.

Prior to performing the MVTR test procedure, a sample to be tested was allowed to condition at a temperature of 23° C. and a relative humidity of 50%. The sample to be tested was placed directly on the ePTFE membrane mounted to the surface of the water bath and allowed to equilibrate for 15 minutes prior to the introduction of the cup assembly.

The cup assembly was weighed to the nearest 1/1000 g and was placed in an inverted manner onto the center of the test sample.

Water transport was provided by a driving force defined by the difference in relative humidity existing between the water in the water bath and the saturated salt solution of the inverted cup assembly. The sample was tested for 10 minutes and the cup assembly was then removed and weighed again within 1/1000 g.

The MVTR of the sample was calculated from the weight gain of the cup assembly and was expressed in grams of water per square meter of sample surface area per 24 hours. Five areas within a sample were tested and the average value is reported here.

Overcoming the Problem

After understanding the failure mechanism of the 2 mil laminates during washing, a pattern of adhesive that is still discontinuous (for breathability) but interconnected (vs. discrete as in the dots above) was used. This pattern is anticipated to distribute the stresses that lead to delamination. Experiments were conducted with a gravure roll engraved in a grid pattern as shown in FIG. 2. In addition to printing the adhesive in a grid pattern, the roll also deposited more adhesive (16–18 g/yd$^2$). The results are as follows:

| Type of Gravure Pattern | Breathable Polyurethane Film Thickness | Fabric Type | Avg. MVTR | Wash Hours before Delamination |
|---|---|---|---|---|
| GRID | 2 mil | Woven Taslite | 2436 | >1717 hours |
| GRID | 0.5 mil | Woven Taslite | 4160 | >1717 hours |
| GRID | 2 mil | Tricot Knit | 2193 | 111 hours |
| GRID | 2 mil | Lycra ® Knit | 2673 | >2151 hours |

The test was halted at the number of hours listed. No delamination had occurred.

The data indicate an order of magniture increase in wash durability by the use of this gravure pattern. Note that this significant improvement in wash durability is most likely due to the discontinuous, interconnected pattern of adhesive which allows more uniform distribution of the stresses created by the swelling of the hydrophilic polymer film. Even though the grid pattern has been used here to demonstrate the concept, any other adhesive pattern that meets this requirement of being discontinuous and interconnected is expected to provide similar improvement in wash durability.

Examples of nonporous hydrophilic films include various polyurethane polymers with ethylene oxide units, as well as, polyetheresters, such as are available under Sympatex® and Hytrel® trademarks and polyetheresteramides available under Pebax® trademark, and the like.

Suitable fabrics include ones made from cotton, wool, polyamide, polyester, or the like or blends of these materials. These fabrics may be woven, non-woven, knit, or the like.

The foregoing data was obtained on adhesively bonded laminates of a hydrophilic polymer film and a fabric substrate. Once such a wash durable laminate is formed using the novel adhesive pattern; the same lamination method can be repeated to attach another fabric layer to the other side of the polymer film to create a tri-laminate.

I claim:

1. A wash-durable fabric laminate comprising:
   (a) a continuous, non-porous, hydrophilic organic polymer layer;
   (b) a fabric layer;
   wherein the polymer layer is bonded to the fabric layer by a discontinuous, but interconnected adhesive layer in a grid pattern in between; said fabric laminate being water-vapor-permeable, air-impermeable and liquid water impermeable.

2. The fabric laminate of claim 1 wherein the nonporous hydrophilic polymer is a polyurethane.

3. The fabric laminate of claim 2 wherein the fabric layer is a woven, a knitted or a non-woven fabric.

4. The fabric laminate of claim 1 wherein the nonporous hydrophilic polymer layer is 1 mil thick or more.

5. The fabric laminate of claim 2 wherein the nonporous hydrophilic polymer layer is 1 mil thick or more.

6. An article of clothing incorporating the fabric laminate of claim 1.

* * * * *